May 19, 1942.   A. F. KALMAR   2,283,372
APPARATUS FOR TREATING FRUIT
Filed May 20, 1941   3 Sheets-Sheet 3
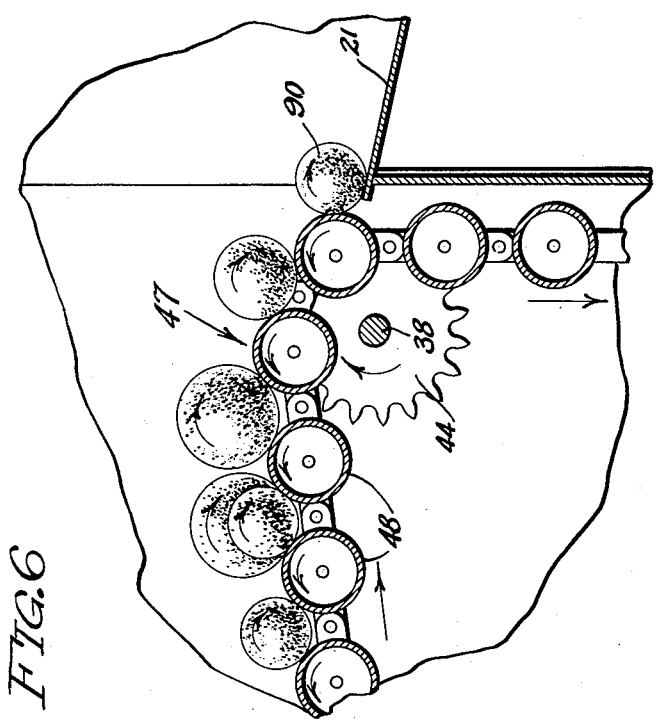
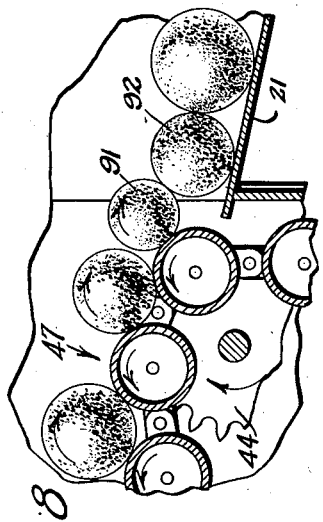
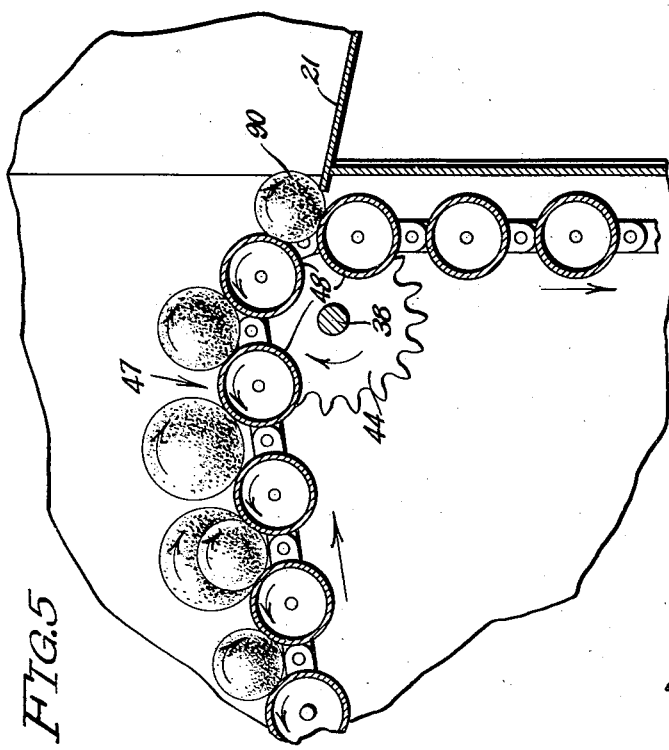
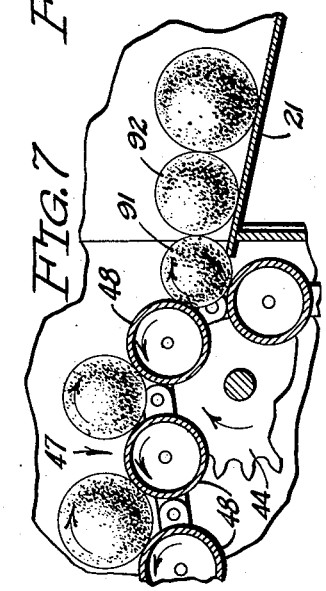
INVENTOR:
ARTHUR F. KALMAR
BY
ATTORNEY Patented May 19, 1942

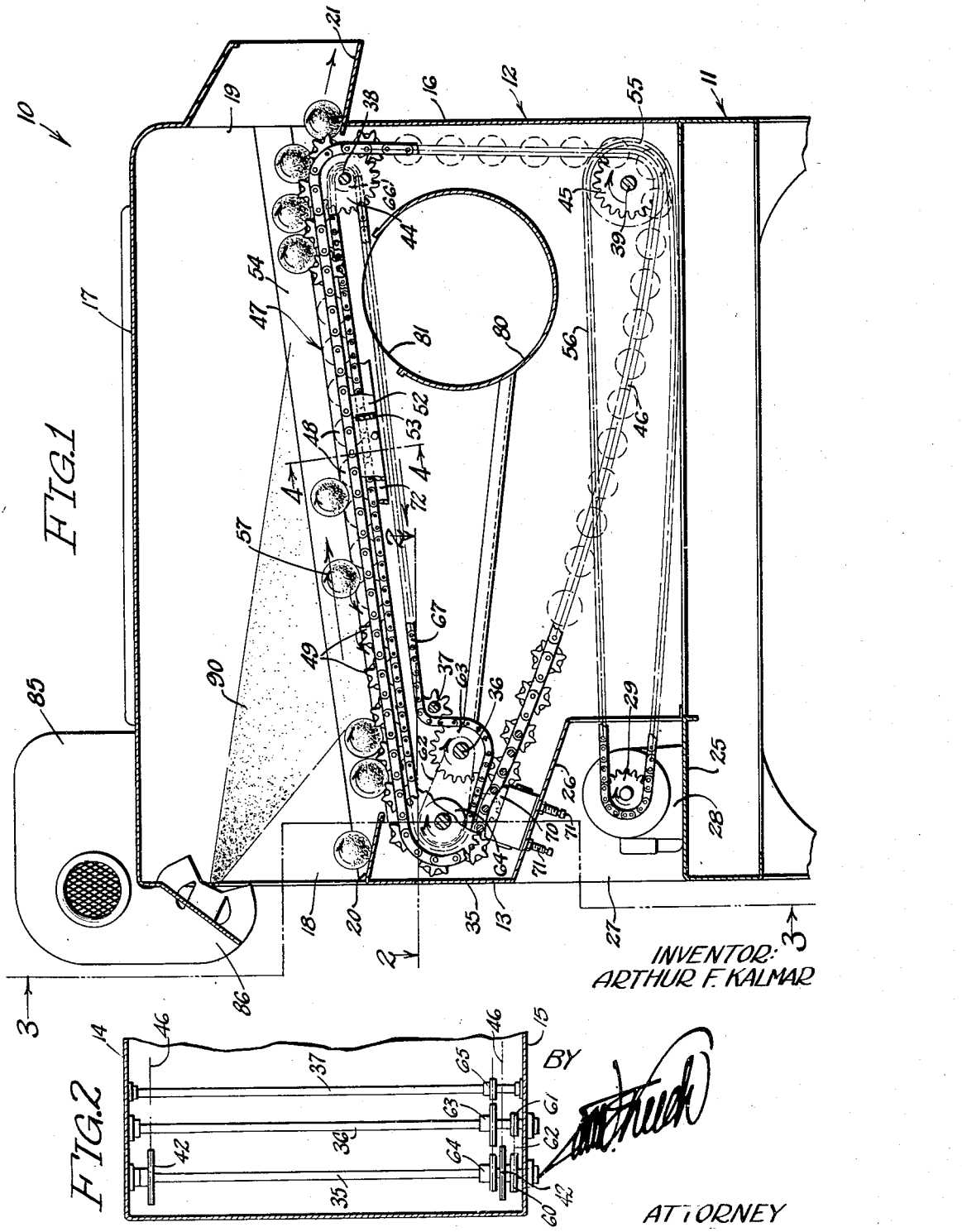

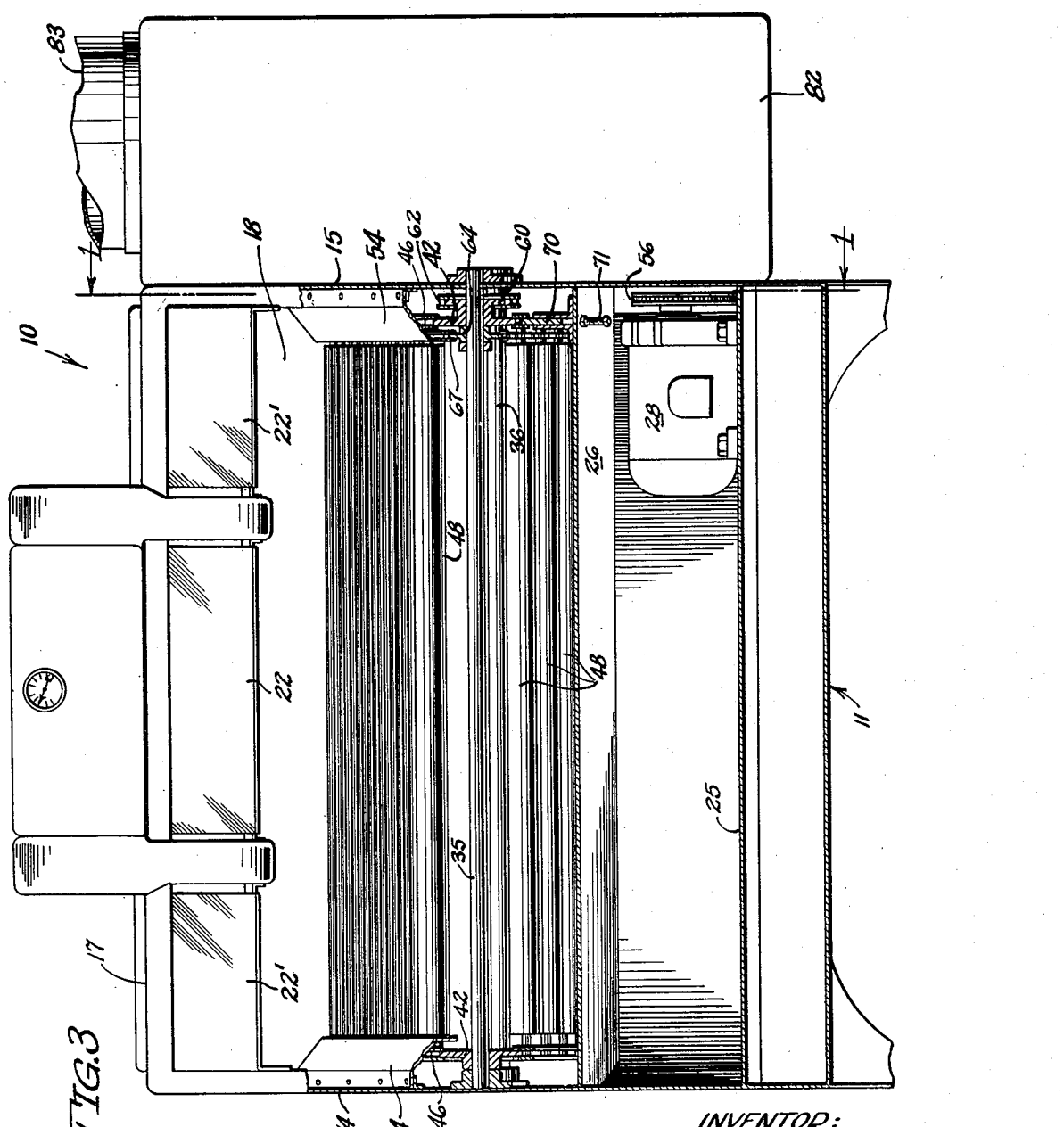

2,283,372

UNITED STATES PATENT OFFICE 2,283,372

APPARATUS FOR TREATING FRUIT

Arthur F. Kalmar, Riverside, Calif., assignor to Food Machinery Corporation, San Jose, Calif., a corporation of Delaware Application May 20, 1941, Serial No. 394,318

6 Claims. (Cl. 91—44)

This invention relates to the art of processing fruit and the like, and particularly to the art of treating fruit with a coating material.

It has for long been common practice to treat certain fruits and certain vegetables with coating material as a part of the process of preparing these commodities commercially for shipment to market. The purpose of this treatment is to inhibit the shrinkage of the commodity treated and thus cause the latter to reach the ultimate consumer in fresh condition. The most common coating material used in this treatment in the past has been paraffin. Other coating materials having advantages over paraffin for use in this treatment of fruit have not gone into use because of the inadequacy of the equipment available for their application to the fruit. For instance, certain resins are very desirable for use as coating materials on fruit by virtue of their clear transparent character causing them to preserve the natural beauty of the fruit and present this unimpaired to the view of the prospective purchaser, but the use of these resins as coating materials has not been practical owing to the fact that these resins accumulate on the equipment used for conveying the fruit so as to render the surfaces of this equipment tacky and thus interfere with the proper handling of the fruit, in some instances causing the fruit to be pinched and crushed by the equipment.

It is an object of my invention to provide an apparatus for handling fruit to facilitate the treatment of the latter with a coating material which will permit the use of a coating material, accumulations of which become tacky, but which apparatus will handle the fruit without damage thereto.

It is a further object of the invention to provide an apparatus for handling fruit while the latter is subjected to a treating process such as the application of a coating material thereto and which apparatus automatically rejects the feeding thereto of a stream of fruit in excess of a given maximum volume.

The manner of accomplishing the foregoing objects, as well as further objects and advantages, will be made manifest in the following description taken in connection with the accompanying drawings, in which:

Fig. 1 is a transverse sectional view of a preferred embodiment of the apparatus taken on the line 1—1 of Fig. 3.

Fig. 2 is a diagrammatic plan view taken on the line 2—2 of Fig. 1.

Fig. 3 is a vertical transverse sectional view taken on the line 3—3 of Fig. 1.

Fig. 4 is an enlarged, detailed, sectional view taken on the line 4—4 of Fig. 1.

Fig. 5 is an enlarged diagrammatic sectional view of the terminal portion of the conveyor of my invention illustrating the most hazardous position in which a relatively small piece of fruit can be caught between the conveyor rolls and dropboard of the conveyor when said fruit is being delivered from said conveyor to said dropboard.

Fig. 6 is a view similar to Fig. 5 and illustrates the manner in which the conveyor of my invention automatically and effectively removes said small piece of fruit from the position in which it is shown in Fig. 5 and delivers this fruit safely onto the dropboard.

Fig. 7 is a view similar to Fig. 5 illustrating the situation which occurs in the delivery of fruit from said conveyor when fruit is backed up against the discharge end of said conveyor and with a small piece of fruit trapped in the same hazardous position in which such a piece of fruit is illustrated in Fig. 5.

Fig. 8 is a view similar to Fig. 6 in which backed up fruit stands in the way of direct delivery of fruit onto the dropboard and illustrates the manner in which a small piece of fruit is removed by the automatic action of the conveyor of my invention from the most hazardous position in which this fruit can be placed and how said fruit is then discharged from the conveyor on top of an accumulation of backed up fruit on the dropboard of the invention.

Referring specifically to the drawings, the apparatus 10 of the invention includes a base frame 11 on which is supported a conveyor housing 12 having a front wall 13, side walls 14 and 15, a rear wall 16, and a top wall 17. The walls 13 and 16 have fruit intake and discharge openings 18 and 19 respectively, the wall 13 providing a receiving delivery plate 20 at the bottom of the opening 18, while the wall 16 provides a discharge plate or dropboard 21 at the bottom of the opening 19. Extending into the intake opening (see Fig. 3) is a central baffle plate 22 and side baffle plates 22', these plates somewhat restricting the intake of air through the intake opening 18.

The housing 12 is also provided with a floor 25, which floor unites with a plate 26 to provide a motor room 27. Mounted in the room 27 on the floor 25 is an electric motor 28 having a sprocket pinion 29.

Journalled at their opposite ends in suitable bearings provided on the side walls 14 and 15 are shafts 35, 36, 37, 38, and 39. The shaft 35 has conveyor chain sprockets 42 while the shafts 38 and 39 have conveyor chain sprockets 44 and 45, these sprockets having conveyor chains 46 trained thereabout, these chains being part of a fruit carrying conveyor 47. Pivotally mounted between the chains 46 is an endless series of conveyor rollers 48, each of these rollers having a spinner sprocket 49 provided adjacent one of its ends, all of these spinner sprockets being disposed along one side of the machine.

That portion of the conveyor 47 which lies between the sprockets 42 and 44 may be considered the upper flight of the conveyor, and this portion of the conveyor is supported through the chains 46 by the latter traveling on rails 52 which are supported by spacers 53 on the side walls 14 and 15 of the housing.

Extending obliquely downwardly from these side walls are fruit guards 54, lower edges of these guards being bent downwardly just opposite the ends of the rollers 48 as clearly shown in Figs. 1, 3, and 4.

Fixed on the shaft 39 is a sprocket 55 which is connected by a chain 56 to the pinion 29 so that the conveyor 47 is driven when the motor 28 is energized to cause the upper flight of this conveyor to travel in the direction indicated by the arrow 57 (see Fig. 1).

Fixed on the shafts 35 and 36 are sprockets 60 and 61 which are connected by a chain 62 so that the shaft 36 is driven by the shaft 35. Also fixed on the shaft 36 is a spinner drive sprocket 63, while roller 64, sprocket 65, and roller 66 are freely rotatable respectively on shafts 35, 37, and 38.

Encircling the sprockets 63 and 65, and the rollers 64 and 66 (as shown in Fig. 1) is a spinner chain 67.

Provided on the plate 26 is an adjustable cam 70 which is adapted to be adjusted upwardly and downwardly by means of screws 71. This cam lies in the plane of the conveyor chain 46 (shown in Fig. 1) and shifts this chain upwardly as it approaches the adjacent sprocket 42, thereby bringing the spinner sprockets 49 of the rollers 48 supported by this portion of the chains 46 into meshing relation with the chain 67 where the latter extends between the sprockets 64 and 63.

Supporting the chain 67 where this travels between the rollers 64 and 66 so as to maintain this chain in mesh with the spinner sprockets 49 of the rollers in the upper flight of the conveyor 47 is a guide track 72 which is supported on the adjacent track 52 by spacers 73 (see Fig. 4). Extending through the housing 12 is a large diameter suction tube 80 having an opening 81 disposed just beneath the upper flight of the conveyor 47, this tube connecting with a suction blower unit 82 which exhausts air from the tube 80 and discharges it upwardly through a stack 83. When the apparatus 10 is operated, the suction blower unit 82 is energized to suck air downwardly from the space just beneath the upper flight of the conveyor 47, this suction causing a downward flow of air between the rollers 48.

Mounted on the top 17 of the housing 12 is a coating material atomizing unit 85, this unit having two nozzles 86 which extend inwardly through the openings between baffle plates 22 and 22', and when the apparatus 10 is operating directs a stream 90 of atomized particles of coating material downwardly and forwardly into the treating chamber formed by the housing 12 so that said particles are sucked downwardly by the suction through the conveyor 47 and applied to the outer surfaces of the fruit traveling on the upper flight of this conveyor.

Operation

The apparatus of my invention is particularly useful in the applying of coating materials to fresh fruit and the like where said coating materials tend to produce a tacky film on the rollers supporting the fruit. Hitherto, this tacky film has caused a pinching or crushing of the fruit, thus liberating the juice from the fruit onto the apparatus and completely nullifying any good effects which otherwise could be produced by the coating of the fruit. This is true not only as to the fruit which is thus pinched, but as to the other fruit which escapes being pinched but which becomes wet by the juice released onto the apparatus by the damaged fruit.

For purposes of illustration, it may be assumed that the atomizing unit 85 is supplied with a solution of a resinous coating material and that the streams 90 comprise atomized particles of this solution. The fruit is delivered to the apparatus 10 over the fruit receiving plate 20 from which the fruit rolls onto rollers 48 which are traveling in the direction of the arrow 57. At the same time, these rollers are being spun by the spinner chain 67 so that their upper surfaces travel in the opposite direction. This result is produced by the driving of the spinner chain through the sprocket 63 which in turn is driven in the same direction as the conveyor chain sprockets 42 by the drive chain 62 and the sprockets 60 and 61 (see Fig. 2). It is also to be noted that this reverse rotation of the rollers 48 is uniformly imparted thereto by the spinner chain 67 throughout the entire period that these rollers support fruit from the time it is received from the plate 20 until the time this fruit is discharged onto the plate 21.

After the machine has been operating in this manner for a few hours, the resinous coating material contained in the stream 90 tends to be sucked down between the rollers 48 and a sufficient quantity of this applied to the roller surfaces to cause these to become quite tacky. The operation of the apparatus 10, so as to prevent injury to the fruit under these conditions, is best illustrated in diagrammatic operation views 5 to 8 inclusive, in which Fig. 5 illustrates a portion of the conveyor 47 at the discharge end thereof so as to just accommodate a small piece of fruit 90 between an adjacent pair of the rollers 48 and the discharge plate 21. Under ordinary conditions, with an ordinary roller conveyor, the piece of fruit 90 would be crushed if located in this position with the machine in operation. With the machine of my invention, this piece of fruit is instead gently expelled from the dangerous position in which it is shown in Fig. 5 to the position in which it is shown in Fig. 6, while at the same time imparting a rotary motion to the piece of fruit 90 causing this to rapidly roll down the plate 21 away from the conveyor 47. This action of the conveyor 47 which saves even the smaller pieces of fruit placed in positions of jeopardy as shown in Fig. 5, results from the rapid reverse rotation of the rollers 48, not only in the upper flight of the conveyor 47, but while these rollers are passing around the shaft 38 and downwardly between this shaft and the delivery board 21.

Even though the rollers 48 may be quite tacky, this tackiness is no hindrance to the action just described on small pieces of fruit, but actually assists in saving the fruit from damage when the fruit is placed in the position shown in Fig. 5 because the tackiness on the surface of the roller 48 just behind this piece of fruit causes the reverse rotation of this roller to be effective in expelling these pieces of fruit of small diameter from between this roller and the dropboard 20. The medium-sized, or larger pieces of fruit carried on the conveyor 47 are inclined by virtue of the direction of rotation imparted to them by the rollers 48, to freely roll forwardly over the forwardmost of the two rollers supporting them as this forwardmost roller passes downwardly around the shaft 38 so that these pieces of fruit drop far out onto the dropboard 21 and not only make a very gentle contact with this board, but pick up speed on the board in excess of that due to gravity by virtue of the direction in which this fruit is already rotating.

The virtues of this invention are so marked that even when fruit backs up on the discharge plate 21, (as shown in Fig. 7), so as to hold a small-diameter piece of fruit 91 from rolling down this plate, the action of the adjacent roller 48 traveling toward the piece of fruit 91 is to expel this piece of fruit upwardly from between this roller and the next piece of fruit 92 therebeyond until the piece of fruit 91 is positioned as shown in Fig. 8. It is thus clearly seen that even under the extremely adverse conditions illustrated in Figs. 5, 7, and 8, the apparatus of my invention is adapted to handle fruit gently and save it from injury even though the conveyor rollers thereof be coated with a tacky material such as is sometimes used as a coating material for the fruit.

What I claim is:

1. In a fresh fruit handling apparatus, the combination of: a conveyor including an endless series of rollers and disposed for conveying fruit along a given path with said fruit resting entirely on said rollers; a drop board for receiving fruit from said conveyor; means for causing said endless series of rollers to travel parallel with said path, and then move downwardly to deliver fruit from said rollers onto said dropboard; and means for rotating said rollers continuously in a reverse direction to that in which they thus travel, said reverse rotation being effected throughout the time that said rollers are in contact with said fruit.

2. In a fruit coating apparatus, the combination of: a housing providing a suitable enclosed fruit spraying chamber; means for discharging a stream of atomized particles of coating material into said chamber; a conveyor including an endless series of rollers, a given flight of the latter being adapted to support and convey fruit along a given path in said chamber while subjecting said fruit to said spray; a dropboard for receiving fruit from said conveyor; means for causing said rollers to travel along said path and then downwardly to deliver fruit from said conveyor onto said dropboard; and means for causing said rollers to rotate throughout the period they are in contact with said fruit, in a direction to cause the upper surfaces of said rollers to travel in a reverse direction from that in which the rollers travel bodily.

3. A combination as in claim 1, in which reverse rotation of said rollers causes the upper faces thereof to travel rearwardly at a greater speed than the rollers travel forward bodily.

4. In an apparatus for coating fruit, the combination of: a conveyor including an endless series of rotatable rollers having a flight thereof disposed to provide the sole support for fruit resting in the valleys between adjacent rollers; a dropboard for receiving fruit from said conveyor; means to impart motion to said conveyor to cause the rollers in said flight to travel along a given path and then to move downwardly at the end of said path to discharge fruit from said conveyor onto said dropboard; means for producing a draft of air downwardly between the rollers of said conveyor along the path where said rollers are conveying said fruit; means for directing a stream of atomized particles of coating material over the fruit carried on said flight of said conveyor so that said particles are sucked downwardly by said draft; and means for rotating said rollers reversely to their direction of travel throughout their contact with said fruit.

5. In a fresh fruit handling apparatus, the combination of: a conveyor including an endless series of rollers disposed for conveying fruit along a given path with said fruit resting on said rollers in the valleys therebetween, a terminal portion of said path extending downwardly at a substantial angle; a dropboard at the end of said terminal portion of said path for receiving fruit from said conveyor; means for causing said endless series of rollers to travel along said path and past said dropboard; means causing said valleys between adjacent rollers of said conveyor to be supplied with fruit; and means for continuously applying reverse rotation to the rollers of said conveyor throughout their contact with said fruit at least while the latter is travelling along the terminal portion aforesaid of said path.

6. In a fresh fruit handling apparatus, the combination of: a conveyor including an endless series of rollers disposed for conveying fruit with the latter resting on said rollers in the valleys therebetween; rotary means for changing the direction of travel of said series of rollers to increase the downward inclination of the path followed by said rollers; a dropboard for receiving fruit from said conveyor after said change in direction thereof has started; means for causing said rollers to travel along said path and past said dropboard; means causing said valleys between said rollers to be supplied with fruit; and means for reversely rotating each of the rollers of said conveyor at least throughout the period when said roller is close enough to said dropboard for said fruit to contact said roller and said dropboard at the same time.

ARTHUR F. KALMAR.